United States Patent Office 3,298,270
Patented Jan. 17, 1967

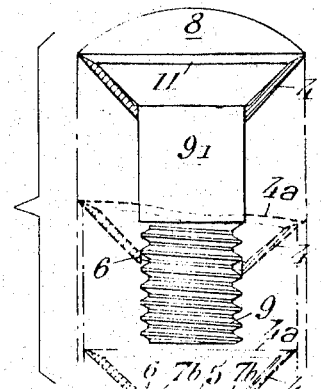
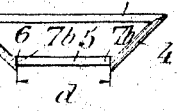
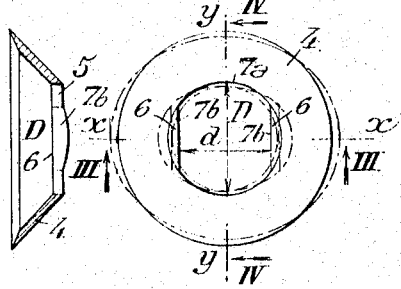
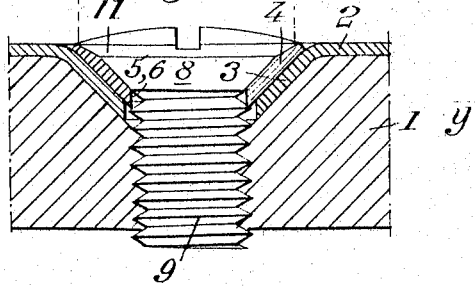
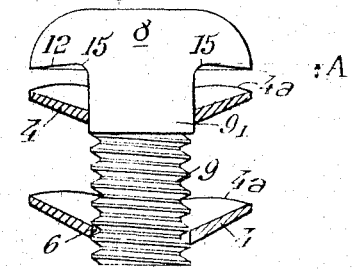
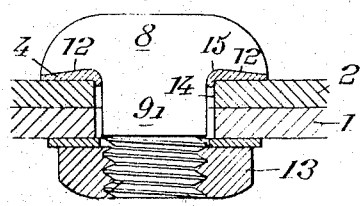
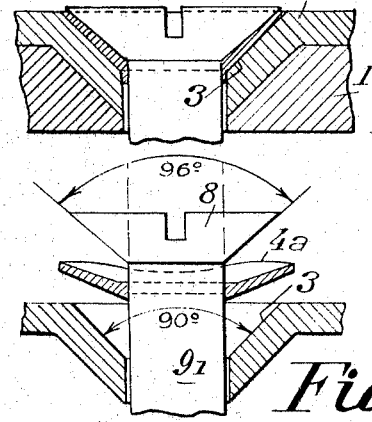
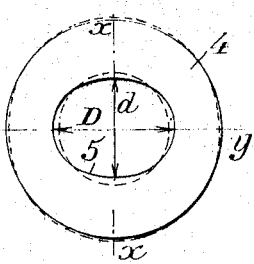

3,298,270
**FIXATION DEVICE COMPRISING
A SCREW AND A RING**
Pierre Launay, 134 Quai Louis Bleriot, Paris, France
Filed Feb. 12, 1965, Ser. No. 432,156
Claims priority, application France, Jan. 17, 1962,
855,110
7 Claims. (Cl. 85—1)

This is a continuation-in-part of the application Serial Number 251,280, filed January 14, 1963, for Improvements in Fixation Devices Comprising a Screw and a Ring, which is now abandoned.

The present invention relates to improvements, in fixation devices comprising a screw and a ring member or washer slipped thereon and ensuring a braking, fluidtightness or other functions.

The object of the present invention is to provide a system of the above mentioned kind which is easier to manufacture than those known up to this time, while complying with the requirements of practice and in particular ensuring a good holding of the ring upon the screw, when engaged thereon.

The invention consists essentially in the association of said screw with a hollow annular conical frustrum ring member made of a plastic material and provided with an oblong central hole or aperture, the smallest dimension of which is slightly smaller than the external diameter of the screw, said ring member being engaged and held on said screw by resilient deformation of said ring member.

Other features of the present invention will become apparent in the course of the following description of some preferred embodiments thereof, with reference to the appended drawing given merely by way of example and in which:

FIG. 1 is an axial sectional view of a screw and ring device made according to the present invention, the ring being shown in two successive different positions thereof;

FIG. 2 is a plan view of the ring of the system of FIG. 1;

FIGS. 3 and 4 are sectional views, at right angle to each other, of the ring of FIG. 1;

FIG. 5 is a sectional view showing the screw and ring device of FIG. 1, and two pieces assembled together by means of this device;

FIGS. 6 to 8 are sections showing the use of a ring member according to the invention in connection with screws having different types of heads.

FIG. 9 is a view analogous to FIG. 2 and showing another embodiment of the ring.

It should be first reminded that it is of interest to use, in combination with screws, ring members which must be adapted to said screws after cadmium plating or similar operations have been exerted on said screws, and in particular, rings made of a plastic material.

However such rings must be arranged so that they do not risk being lost after they have been engaged on the screws and before tightening of said screws on the pieces to be assembled together.

It has already been proposed to provide the ring, for this purpose, with small inward projections adapted to exert a holding action on the screw threads, after said ring has been engaged in position. But this arrangement does not comply perfectly with the requirements of practice. Said projections, due to their small dimensions, are difficult to make. Finally, once in position, they constitute places where the thickness is increased and which interfere with screwing.

The present invention provides a resilient ring member made of a plastic material, the holding of which ring member upon the screw is made to bring into play its resiliency, and for this purpose the ring member is given the shape of a hollow annular conical frustrum with a central aperture having an oblong shape, the short diameter $d$ of said hole being slightly smaller than the external diameter of the screw threads, whereas the long diameter $D$ of said hole is a little greater than said screw external diameter.

In these conditions, engagement of the ring upon the screw requires a resilient deformation of said ring, which deformation creates, on the screw threads, at the time of engagement, an efficient holding action, that is to say what may be considered as a pawl action, the importance of which depends upon the nature, and in particular the flexibility, of the material that is used, and of the thickness of the ring, this action increasing with said thickness.

In particular, the material of the ring may be one of those designated by the trademarks Nylon, Delrin, etc.

In order to ensure the desired holding effect, by providing an oblong-shaped hole in said frusto-conical ring member, I may proceed in various manner.

For instance, as supposed by FIGS. 1 to 8, the central hole, of circular shape, of the ring may be provided with one or several flat faces which limit to a value $d$ the width of said ring member in a direction $x$—$x$, whereas in another direction, in particular an orthogonal one $y$—$y$, this value is $D$ (diameter of the circular hole).

I may also, as shown by FIG. 9, give the outline of the central hole an oval shape, of dimensions $d$ and $D$ along two orthogonal axes $x$—$x$ and $y$—$y$, respectively.

In the embodiments of FIGS. 1 to 5 and 8, the ring 4 is shown mounted on screws having conical heads 8, to secure two pieces such as 1 and 2 into position with respect to each other, the piece 2 comprising a conical portion 3 adapted to engage a conical recess of piece 1, such arrangements being shown merely by way of examples.

The central hole of the ring member 4 is defined advantageously by two arcuate walls 7a opposite from each other and forming the arcs of a same circle having a diameter D, these arcuate borders being connected by two flat surfaces 6 with internal and parallel walls 7b spaced from each other at a distance $d$, such flat surfaces 6 and walls 7b permitting the exertion of a pressure on the screw to ensure the engagement on the screw 8 and the holding thereon of the ring member 4. As shown in the drawings, the walls 7b form an acute angle, that is, an angle less than ninety degrees, with the outer surface of the hollow annular frustrum.

Said walls 7b may have a slightly increased thickness, as visible on FIGS. 3 and 4. This permits principally an easier manufacture of said ring members. In addition this increase of thickness, of course, enhances the resistance to the tendency of said walls 7b to crimp along the shank of the screw.

In these conditions, being given a screw 8, with its threads 9 already prepared and preliminarily treated, it suffices, in order to place the hollow annular conical frustrum shaped ring 4 in position, to engage it on said threads and to push it axially toward the screw head. When passing over each of the screw threads, the flat faces 6 move away from each other, owing to the resilient deformability of the ring, so that said ring acts as a kind of pawl. An axial displacement in the other direction causes in the contrary the opposite faces 6 to converge against each other so that the portion of the walls 7b which form an acute angle with the outer surface of the frustrum engages the thread of the screw and is resiliently urged towards the central axis of the screw thereby preventing removal of the ring from the screw by a force applied to the washer so that the washer can be removed only by unscrewing it.

This deformation is visible in dotted lines, in a very exaggerate manner for the sake of clarity, in the plan view of FIG. 2, and it is also visible in an elevational view in FIG. 1, for an intermediate position taken by the ring when it is engaged on the threaded portion of the screw, as evidenced by the deformation of the apex-angle and of the outer contour 4a of the ring member 4, the width of said border increasing in the direction x—x and decreasing in the direction y—y. The drawing thus shows quite well that the deformation affects the whole ring member.

Finally, the ring comes to bear first possibly against the smooth portion 9₁ of the screw and then against the conical portion of the head thereof. Once stopped in this position, the above mentioned displacement, of the pawl and ratchet type, is substantially nonreversible.

FIG. 9 illustrates the case where the central hole 5 is of oval shape, which gives the same results as above explained. In said FIG. 9 the deformation, when engaging the ring 4 on the screw, is visible in dotted lines.

In all cases, whether the hole of the ring is oval (FIG. 9), or circular with flat faces (FIGS. 2 and 7), it is possible to utilize, for making the rings, any manufacturing methods, in particular by moulding under pressure, this method being easy to apply due to the simplicity of the pieces.

It will be understood that the screw manufacturer may easily mount the rings on the screws so that said screws are sold to the user with rings already in position and however without risks of loss of said rings.

On the other hand, the deformability of the material enables the body of the ring to undergo any deformation as may be useful to enable it to adapt itself both to the shape of the screw and to that of the part to be tightened by means of said screw. Assembly of the elements is shown by FIG. 5, where it is supposed that the screw is to be fixed in a conical hole of piece 1.

The existence of angle differences between the cone of the ring and the cone of the screw does not matter so that it is not necessary to work in a very accurate manner when taking the ring.

A housing may be provided in the screw head to receive the ring. Such a housing may be limited by an edge or border, visible at 11 in FIGS. 1 and 5, having an apex angle greater than the rest of the screw head.

In the embodiments of FIGS. 6 and 7, the rings are shown in use with screws the head of which comprises a bearing surface 12 substantially at 90° to the direction of the screw, the whole being used for instance in combination with a nut 13 (FIG. 7).

Advantageously, the rings are given a thickness which decreases toward the outside, so that their interior and exterior respective faces form, for instance, an angle of 5° (see FIG. 6). This arrangement causes, when the screw is tightened, the plastic material to flow toward the central hole, toward the clearance 14 existing between the screw and the hole of the pieces to be assembled together. I thus provide at 15 (FIG. 7), at the inlet of said hole, a double braking and fluid-tightness effect.

Advantageously also, the bearing surface 12 of the screw head may be given some conicity tending to provide a supplementary play on the side of the screw shank, the cone angle A having itself a volume of 5° with respect to a plan perpendicular to the shank of the screw. This facilitates the above mentioned flow of the material of the ring and permits of increasing the radius of the fillet 15 and therefore of increasing the strength of the screw.

The same can be applied to screws with conical heads having an apex angle, for instance of 96 degrees, which may be used in connection with a conical portion 3 of a member 2 which is to be engaged by said screw head, said conical portion having a slightly smaller apex angle, for instance of 90 degrees (FIG 8).

Thus in the same manner as hereinabove in connection with the embodiment of the invention shown in FIGS. 6 and 7, the plastic material is cause to flow toward the central hole of said conical portion 3 and the shank of the screw 9 when the latter is tightened in position, owing to this difference of the apex angles of said conical portion and said screw head.

For instance in the case of ring members having a thickness of 15 mm. and adapted for use with screws the diameter of which is of 8 mm., said rings may be given an original apex angle, for instance, from about 134°. Such ring members are sufficiently deformable to be usable with either of the screws envisaged in this description, the ring members being adapted in each case to fit the shapes of the screw head and the corresponding part on which said screw is mounted.

The operation of the fixation device according to the present invention results sufficiently clearly from the preceding description to make it unnecessary to describe it any further.

Such a device has, in particular, the following advantages:

Its manufacture is cheap, owing to the simplicity of the shape and therefore of the moulds to be provided;

It eliminates any external projections which may deform and come to obstruct the threads or the holes of the pieces, thus interfering with locking;

And, chiefly, it permits an efficient securing of the rings on the screws, thus providing for fluidtightness, account being taken of the fact that the holding action is determined and constant, depending in every case only upon the thickness of the ring, said action being in fact produced by the resilient deformation of the whole of said ring.

In particular the plastic material of said ring members deforms itself to compensate the unevenesses of as well the screw head as the part on which the screw is fixed.

The torque for locking the screw in position is about 50% of the locking torque required when using classical screws whether coupled or not with braking and anchoring washers.

Numerous tests have shown that, within two weeks following the locking in position of screws provided with ring members or washers of the type described in the application, the torque for unlocking such screws has become the double of the torque previously used for said locking, owing to the fact that the plastic material of the ring member has adapted itself to a maximum, through deformation, with the surfaces applied against each other.

In a general manner, while I have, in the above description, disclosed what I deem to be practical and efficient embodiments of the invention, it should be well understood that I do not wish to be limited thereto as there might be changes made in the arrangement, disposition and form of the parts without departing from the principle of the present invention as comprehended within the scope of the appended claims.

What I claim is:

1. A sealing washer for use in combination with a screw member having a predetermined internal diameter and a predetermined external diameter, said washer being in the shape of a hollow annular conical frustrum, the frustrum having an annular conical outside surface, and the said washer being of such a resiliency that it tends to maintain its shape, said washer having a central aperture formed by an aperture wall and having a short diameter and a long diameter, the said short diameter being less than the said screw external diameter, and the long diameter being substantially perpendicular to the short diameter and being greater than the said screw external diameter, wherein the said walls of the aperture, at least at the ends of the short diameter, form an acute angle with the said outside surface of the washer, said diameters of said washer being so proportioned that by urging the portions of the washer located at opposite ends of the said long diameter towards each other thereby deforming the entire washer and deforming the aperture, the said short diameter increases to become substantially equal to the said screw external diameter enabling mounting of said washer on said screw from an end thereof by a transitory motion, the resilience of the washer being such that upon release of the said portions of the washer adjacent opposite ends of the long diameter the washer will attempt to assume its original shape and thereby grip the screw when mounted thereon, the said acute angle engaging the thread of the screw and being resiliently urged toward the axis of the screw to act as a positive stop to prevent removal of the washer from the screw member by a force applied to the washer in a direction towards the said end of the screw.

2. A sealing washer according to claim 1 wherein said screw member comprise a conical head provided at its periphery with a border having an apex angle greater than the apex angle of said screw head.

3. A sealing washer according to claim 1 wherein said aperture has a smooth oval shape, the width of the oval being the said short diameter and the length of the oval being the said long diameter.

4. A sealing washer according to claim 1 wherein the aperture is defined by two arcuate walls opposite from each other and forming the arcs of a same circle, the diameter of which is the said long diameter, and by two parallel straight walls connecting the respective extremities of said opposite arcuate walls, the distance between the said straight walls being the said short diameter.

5. A sealing washer according to claim 4 wherein said straight walls have a slightly increased thickness with respect to the thickness of said arcuate walls.

6. A sealing washer according to claim 1 wherein the thickness of said washer decreases from the contour of said aperture to the external periphery of said washer member.

7. A sealing washer according to claim 6 wherein the interior and exterior faces of said washer form an angle of about 5 degrees.

References Cited by the Examiner
UNITED STATES PATENTS

| | | |
|---|---|---|
| 316,619 | 4/1885 | Hayes. |
| 1,134,520 | 4/1915 | Dyba _____ 151—30 |
| 1,356,873 | 10/1920 | Monteath. |
| 2,097,713 | 11/1937 | Ashley. |
| 2,176,411 | 10/1939 | Washer _____ 85—50 |
| 2,326,455 | 8/1943 | Gray. |
| 2,833,325 | 5/1958 | Laisy _____ 85—9 |
| 3,038,456 | 6/1962 | Dreisin _____ 277—236 |
| 3,062,557 | 11/1962 | Underwood. |
| 3,203,304 | 8/1965 | Rapata _____ 85—50 |

FOREIGN PATENTS

| | | |
|---|---|---|
| 911,681 | 5/1954 | Germany. |

CARL W. TOMLIN, *Primary Examiner.*

M. PARSONS, JR., *Assistant Examiner.*